United States Patent [19]

Sun et al.

[11] Patent Number: 5,286,467

[45] Date of Patent: * Feb. 15, 1994

[54] HIGHLY EFFICIENT HYBRID PROCESS FOR NITROGEN OXIDES REDUCTION

[75] Inventors: William H. Sun; John E. Hofmann; M. Linda Lin, all of Naperville, Ill.

[73] Assignee: Fuel Tech, Inc., Stamford, Conn.

[*] Notice: The portion of the term of this patent subsequent to Dec. 18, 2007 has been disclaimed.

[21] Appl. No.: 907,222

[22] Filed: Jul. 1, 1992

Related U.S. Application Data

[63] Continuation-in-part of Ser. No. 626,439, Dec. 12, 1990, Pat. No. 5,139,754, which is a continuation-in-part of Ser. No. 408,122, Sep. 12, 1989, Pat. No. 4,978,514.

[51] Int. Cl.$^5$ .......................... B01J 8/00; C01B 21/00
[52] U.S. Cl. .................................. 423/239.1; 423/235
[58] Field of Search .................. 423/235, 235 D, 239, 423/239 A

[56] References Cited

U.S. PATENT DOCUMENTS

| | | | |
|---|---|---|---|
| 4,087,513 | 5/1978 | Schell | 423/437 |
| 4,119,702 | 10/1978 | Azuhata et al. | 423/235 |
| 4,168,299 | 9/1979 | Schell | 423/358 |
| 4,208,386 | 6/1980 | Arand et al. | 423/235 |
| 4,302,431 | 11/1981 | Atsukawa et al. | 423/239 |
| 4,325,924 | 4/1982 | Arand et al. | 423/235 |
| 4,393,031 | 7/1983 | Henke | 423/239 |
| 4,652,678 | 3/1987 | Douwes | 564/73 |
| 4,780,289 | 10/1988 | Epperly et al. | 423/235 |
| 4,830,839 | 5/1989 | Epperly et al. | 423/235 |
| 4,902,488 | 2/1990 | Epperly et al. | 423/235 |
| 4,946,659 | 8/1990 | Held et al. | 423/212 |
| 4,978,514 | 12/1990 | Hofmann et al. | 423/235 |
| 4,981,660 | 1/1991 | Leach | 423/235 |
| 5,017,347 | 5/1991 | Epperly et al. | 423/235 |
| 5,057,293 | 10/1991 | Epperly et al. | 423/235 |

FOREIGN PATENT DOCUMENTS

| | | |
|---|---|---|
| 2-191528 | 7/1990 | Japan . |
| 8105027 | 6/1983 | Netherlands . |

*Primary Examiner*—Gregory A. Heller
*Attorney, Agent, or Firm*—St. Onge Steward Johnston & Reens

[57] ABSTRACT

A process for reducing nitrogen oxides in a combustion effluent is presented. The process involves introducing a nitrogenous treatment agent other than ammonia into the effluent to create a treated effluent having reduced nitrogen oxides concentration such that ammonia is present in the treated effluent; introducing a source of ammonia into the effluent; and contacting the treated effluent with a nitrogen oxides reducing catalyst.

16 Claims, No Drawings

HIGHLY EFFICIENT HYBRID PROCESS FOR NITROGEN OXIDES REDUCTION

RELATED APPLICATION

This application is a continuation-in-part of copending and commonly assigned U.S. patent application entitled "Combined Catalytic/Non-Catalytic Process for Nitrogen Oxides Reduction", having Ser. No. 07/626,439, filed in the names of Luftglass, Sun, and Hofmann on Dec. 12, 1990, now U.S. Pat. No. 5,139,754, which in turn is a continuation-in-part of U.S. patent application entitled "Combined Catalytic/Non-Catalytic Process for Nitrogen Oxide Reduction", having Ser. No. 07/408,122, filed in the names of Hofmann, Sun and Luftglass on Sep. 12, 1989, now U.S. Pat. No. 4,978,514, the disclosures of each of which are incorporated herein by reference.

DESCRIPTION

Technical Field

The present invention relates to a process for reducing nitrogen oxides ($NO_x$, where x is an integer, generally 1 or 2) in the effluent (or flue gas) from the combustion of carbonaceous fuels and other organic matter. The inventive process is a hybrid of catalytic and non-catalytic processes to achieve reductions in nitrogen oxides in an efficient, economical and safe manner not before seen.

Carbonaceous fuels can be made to burn more completely, and with reduced emissions of carbon monoxide (CO) and unburned hydrocarbons, when the oxygen concentrations and air/fuel ratios employed are those which permit high flame temperatures. When fossil fuels are used in suspension fired boilers such as large utility boilers, temperatures above about 2000° F. and typically about 2200° F. to about 3000° F. are generated. Unfortunately, such high temperatures, as well as hot spots of higher temperatures, tend to cause the production of thermal $NO_x$, the temperatures being so high that atomic oxygen and nitrogen are formed and chemically combine as nitrogen oxides. Nitrogen oxides can also be formed as the result of oxidation of nitrogen containing species in the fuel, such as those found in heavy fuel oil, municipal solid waste and coal. $NO_x$ can form even in circulating fluidized bed boilers which operate at temperatures that typically range from 1300° F. to 1700° F.

Nitrogen oxides are troublesome pollutants found in the combustion effluent streams of boilers and other combustion units when fired as described above, and comprise a major irritant in smog. It is further believed that nitrogen oxides contribute to tropospheric ozone, a known threat to health, and can undergo a process known as photochemical smog formation, through a series of reactions in the presence of sunlight and hydrocarbons. Moreover, nitrogen oxides comprise a significant contributor to acid rain, and have been implicated as contributing to the undesirable warming of the atmosphere, commonly referred to as the "greenhouse effect".

Recently, many processes for the reduction of $NO_x$ in combustion effluents have been developed. They can generally be segregated into two categories: selective and non-selective. Among the selective processes, which are believed in the art to be the more desirable, there is a further division between selective catalytic reduction (SCR) and selective non-catalytic reduction (SNCR) processes.

SCR processes usually involve passing the nitrogen oxides-laden effluent across a catalyst bed in the presence of ammonia ($NH_3$), to achieve $NO_x$ reductions as high as 50% or even as high as 95% or higher. SNCR processes involve the introduction of $NO_x$-reducing treatment agents into the effluent to achieve reductions of up to 50% or greater.

Unfortunately, both SCR and SNCR processes have been found to have certain drawbacks. With respect to SCR, the expense of installing and operating the catalyst system causes such processes to be of limited economic value, even considering the high nitrogen oxides reductions achieved. In addition, the requirement for the addition of large amounts of ammonia is undesirable due to the toxicity and handling problems which accompany large reservoirs of ammonia. In fact, in certain jurisdictions, ammonia must be transported as ammonium water, which can be as dilute as 25% or even 10% ammonia. The need for providing ammonia for the SCR process from ammonium water creates significant additional costs and reductions in efficiency because of the need to transport large amounts of ammonium water and the equipment needed to evolve ammonia.

With respect to SNCR, the most significant $NO_x$ reductions fall below those of SCR processes. They are achieved by introduction of a nitrogenous treatment agent and/or a hydrocarbon treatment agent, which can lead to the generation and emission of ammonia (referred to as ammonia slip or ammonia breakthrough) and/or carbon monoxide. Both ammonia and carbon monoxide are considered pollutants in and of themselves.

Background Art

As noted, processes and compositions for the reduction of nitrogen oxides in effluents from the combustion of carbonaceous fuels have been developed extensively over recent years. With the increased attention to the health risks and environmental damage caused by agents such as smog and acid rain, it is expected that $NO_x$ reduction research will continue to be pursued.

Selective catalytic reduction processes for reducing $NO_x$ are well known and utilize a variety of catalytic agents. For instance, in European Patent Application WO 210,392, Eichholtz and Weiler discuss the catalytic removal of nitrogen oxides using activated charcoal or activated coke, as a catalyst with the addition of ammonia. Kato et al., in U.S. Pat. No. 4,138,469, and Henke, in U.S. Pat. No. 4,393,031, disclose the catalytic reduction of $NO_x$ using platinum group metals and/or other metals such as titanium, copper, molybdenum, vanadium, tungsten, or oxides thereof with the addition of ammonia to achieve the desired catalytic reduction.

Another catalytic reduction process is disclosed by Canadian Patent 1,100,292 to Knight which relates to the use of a platinum group metal, gold, and/or silver catalyst deposited on a refractory oxide. Mori et al., in U.S. Pat. No. 4,107,272, discuss the catalytic reduction of $NO_x$ using oxysulfur, sulfate, or sulfite compounds of vanadium, chromium, manganese, iron, copper, and nickel with the addition of ammonia gas.

In a multi-phased catalytic system, Ginger, in U.S. Pat. No. 4,268,488, discloses exposing a nitrogen oxides containing effluent to a first catalyst comprising a copper compound such as copper sulfate and a second catalyst comprising metal combinations such as sulfates of vanadium and iron or tungsten and iron on a carrier in the presence of ammonia.

In the past, most SNCR processes for reducing nitrogen oxides levels have concentrated on achieving maximum $NO_x$ reductions without addressing the problems raised by the production of other pollutants, such as ammonia and carbon monoxide. More recently, in a unique application of nitrogen oxides reducing principles, Epperly, Peter-Hoblyn, Shulof, Jr., and Sullivan, in U.S. Pat. No. 4,777,024, and Epperly, Peter-Hoblyn, Shulof, Jr., Sullivan, Sprague, and O'Leary in U.S. Pat. No. 5,057,293, disclose a method of achieving substantial nitrogen oxides reductions without the production of a major amount of other pollutants through a multiple stage treatment agent injection process. Although minimizing the production of other pollutants, this process, like any process which involves the high temperature introduction of nitrogenated compounds such as urea or ammonia, will still generate some secondary pollutants.

This is also the case with the teaching of U.S. Pat. No. 4,780,289, issued to Epperly, O'Leary and Sullivan, which discloses another method for maximizing $NO_x$ reductions while minimizing other pollutants. Although minimized, such other pollutants are still present.

In U.S. Pat. No. 4,302,431, Atsukawa et al. disclose a process for nitrogen oxides reduction which involves introducing ammonia into an exhaust gas at 700° C. (1292° F.) to 1300° C. (2372° F.), and then passing the exhaust gas over a catalyst at a temperature between 300° C. (572° F.) and 500° C. (932° F.) (preferably with the introduction of additional ammonia) to decompose remaining $NO_x$ and ammonia.

What is desired, therefore, is a process for nitrogen oxides reduction which can achieve substantial reductions in $NO_x$ while reducing the necessity for transport, storage, and handling of ammonia itself or as ammonium water.

DISCLOSURE OF INVENTION

As noted above, the process of the present invention is effective for reducing the nitrogen oxides content of the effluent from the combustion of carbonaceous fuels and other organic matter, such as coal, oil, natural gas, and municipal solid waste (MSW). The process involves introducing into the effluent at least one treatment agent which comprises a nitrogenous composition other than ammonia to reduce the nitrogen oxides concentration in the effluent. The treatment agent is introduced such that the treated effluent (i.e., after introduction of the treatment agent) contains ammonia. The inventive process then involves passing the effluent over a catalyst bed wherein the effluent ammonia is available to be consumed in the catalyzed reduction of $NO_x$.

The treatment agent to be introduced into the effluent comprises a nitrogenous composition, by which is meant a composition having at least one component containing as an element thereof nitrogen, other than ammonia. The reduction of nitrogen oxides by such treatment agents comprises a selective, free radical-mediated process, often referred to as selective non-catalytic reduction (SNCR). Suitable nitrogenous compositions for use as the treatment agent include urea such as disclosed by Arand et al. in either of U.S. Pat. No. 4,208,386 and U.S. 4,325,924, the disclosures of each of which are incorporated herein by reference. The use of urea is highly preferred as the nitrogenous treatment agent of this invention since the toxicity and instability of ammonia are avoided.

Additional appropriate nitrogenous treatment agents and methods known as being effective for the reduction of nitrogen oxides include those disclosed by International Patent Application entitled "Reduction of Nitrogen- and Carbon-Based Pollutants Through the Use of Urea Solutions," having Publication No. WO 87/02025, filed in the name of Bowers on Oct. 3, 1986; U.S. Pat. No. 4,751,065 in the name of Bowers; U.S. Pat. No. 4,719,092, to Bowers; U.S. Pat. No. 4,927,612, also to Bowers; U.S. Pat. No. 4,770,863 to Epperly and Sullivan; U.S. Pat. No. 4,888,165 to Epperly and Sullivan; U.S. Pat. No. 4,877,591 to Epperly and Sullivan; U.S. Pat. No. 4,803,059 to Sullivan and Epperly; U.S. Pat. No. 4,863,705 to Epperly, Sullivan and Sprague; U.S. Pat. No. 4,844,878 to Epperly, Sullivan and Sprague; U.S. Pat. No. 4,770,863 to Epperly and Sullivan; International Patent Application entitled "Composition for Introduction into a High Temperature Environment," having Publication No. WO 89/10182, filed in the names of Epperly, Sprague and von Harpe on Apr. 28, 1989; U.S. Pat. No. 4,902,488 to Epperly, O'Leary, Sullivan and Sprague; U.S Pat. No. 4,863,704 to Epperly, Peter-Hoblyn, Shulof, Jr., Sullivan and Sprague; U.S. Pat. No. 4,873,066 to Epperly, Sullivan and Sprague; International Patent Application entitled "Nitrogen Oxides Reduction Using a Urea Hydrolysate", having Publication No. WO 92/02450, filed in the names of von Harpe, Pachaly, Lin, Diep, and Wegrzyn on Aug. 1, 1991, the disclosures of each of which are incorporated herein by reference.

These patents and applications contemplate the use of treatment agents which comprise hexamethylenetetramine (HMTA), urea (or one or more of its hydrolysis products such as ammonium carbamate, ammonium carbonate, and ammonium bicarbonate), a urea hydrolysate which consists of a unique structure of ammonium carbonate and ammonium bicarbonate in a complex with ammonium carbamate, or other ammonium salts like ammonium formate and ammonium oxalate.

The nitrogenous treatment agents can optionally be enhanced by other compositions such as hexamethylenetetramine (HMTA), oxygenated hydrocarbons such as ethylene glycol, ammonium salts of organic acids such as ammonium acetate and ammonium benzoate, heterocyclic hydrocarbons having at least one cyclic oxygen such as furfural, sugar, molasses, 5- or 6-membered heterocyclic hydrocarbons having at least one cyclic nitrogen such as pyridine and pyrolidine, hydroxy amino hydrocarbons such as milk or skimmed milk, amino acids, proteins and monoethanolamine and various other compounds which are disclosed as being effective at the reduction of nitrogen oxides in an effluent.

Most preferred among these enhancers are the oxygenates, such as the oxygenated hydrocarbons, heterocyclic hydrocarbons having at least one cyclic oxygen, sugar and molasses. In fact, several of the enhancers, especially the oxygenates and certain of the ammonium salts, can themselves function as $NO_x$-reducing treatment agents in an independent introduction. Of course, it will be recognized that a non-nitrogenous treatment agent will not lead to the presence of ammonia in the effluent as desired, and explained in more detail below. Accordingly, such a treatment agent should be introduced as an adjunct to a nitrogenous treatment agent.

The introduction of a urea hydrolysate as the nitrogenous treatment agent can have significant advantages due to the ability of the urea hydrolysate to reduce nitrogen oxides over a relatively wide effluent temperature window, while minimizing the generation of nitrous oxide ($N_2O$), another pollutant.

Under the proper conditions, urea hydrolyzes to products which are believed to include ammonia ($NH_3$), ammonium carbamate ($NH_2COONH_4$) ("carbamate"), ammonium carbonate (($NH_4)_2CO_3$) ("carbonate"), and ammonium bicarbonate ($NH_4HCO_3$) ("bicarbonate"). Hydrolysis generally continues sequentially from carbamate, through carbonate and then to bicarbonate, each composition being more stable than urea.

Although each of the noted hydrolysis products is individually commercially available, it is more desirable to produce them via urea hydrolysis under the conditions detailed below. This is because the thusly formed hydrolysate has advantages over the individual hydrolysis products, even if combined in the same approximate ratios. A primary advantage is cost, since urea can be significantly less expensive than the individual hydrolysis products. Additionally, a maximum solubility of about 25% for the hydrolysate (based on initial urea concentration) has been observed, which is superior to the solubility of bicarbonate, i.e., about 18%. This can be significant in terms of transportation costs and final treatment agent concentrations.

According to solubility and structural analyses, including high pressure liquid chromatography (HPLC) using phosphoric acid as solvent; carbon-13 nuclear magnetic resonance spectroscopy (NMR); thermal gravimetric analysis (TGA); differential scanning calorimetry (DSC); and measurement of "P" or "M" alkalinity by acid titration, the hydrolysate prepared according to this invention comprises at least in part a single unique structure of carbonate and bicarbonate which is in a complex with carbamate (expressed as carbamate.bicarbonate/carbonate).

If the pressure exerted on the hydrolysate solution is sufficiently high, ammonia also produced does not flash off, but remains in solution and remains available to contribute to the catalytic reduction of $NO_x$. In addition, depending on the conditions employed, residual urea may also be present.

Although a urea solution will hydrolyze under ambient conditions, typically less than 1% will do so, an insignificant amount in terms of facilitating the catalytic reduction of nitrogen oxides. In forming the inventive hydrolysate, temperature, pressure, concentration of the initial urea solution, and residence time are all important parameters, and must be balanced. High pressure is particularly useful because the reaction proceeds in the direction of smaller mole volumes during the formation of carbamate and carbonate. Higher temperature and longer residence times also result in higher levels of hydrolysis. However, under equivalent pressures, temperatures, and residence times, hydrolysis decreases with increases in solution concentration.

Advantageously, hydrolysis of a 10% aqueous urea solution should be conducted under pressures sufficiently high to maintain the resulting hydrolysate in solution. Such pressures will also facilitate hydrolysis. Desirably, hydrolysis is performed under pressures of at least about 500 pounds per square inch (psi), more preferably at least about 650 psi. If it is desired to maintain ammonia in solution, the pressure should be at least about 750 psi. As the concentration of the initial urea solution is increased, the pressure is preferably increased to achieve equivalent results.

There is no true upper limit of pressure in terms of facilitating hydrolysis; rather, any upper limits comprise practical as opposed to technical limits, since higher pressures, i.e., pressures above about 3000 psi, require vessels able to stand such pressures, which are generally more expensive and usually unnecessary.

At the desired pressures, the temperatures and residence times can be varied. Temperatures of only about 250° F. will ensure the presence of some hydrolysate (e.g., no more than about 5%), whereas temperatures of about 600° F. to 700° F. will ensure that virtually all the urea has been converted to hydrolysate. Residence times can vary between about three minutes and about 15 minutes, preferably about five minutes to about 10 minutes. It will be recognized that the upper temperature and residence time limits are less important since exceeding them will not result in lower levels of hydrolysis or a less effective hydrolysate, it is believed.

The temperature and residence time for urea hydrolysis are related, and one (i.e., time) can be decreased as the other (i.e., temperature) is increased. For instance, hydrolysis at 400° F. for 10 minutes may be generally equivalent to hydrolysis at 500° F. or five minutes and hydrolysis at 600° F. for three minutes.

As noted, hydrolysis proceeds to consecutively form carbamate, carbonate, and bicarbonate. Although all three are present even under the least severe conditions, it is desired that the ratio of carbamate to bicarbonate/carbonate in the hydrolysate be about 10:1 to about 1:20, more preferably about 2:1 to about 1:10 for greatest effectiveness. This can be achieved by hydrolyzing at a fluid temperature of at least about 325° F. for about five minutes or longer.

Most preferably, the hydrolysis of urea is conducted in the presence of metal catalysts such as copper catalysts like copper nitrate, nickel catalysts like nickel sulfate, and iron catalysts like iron (III) nitrate, with the copper and nickel catalysts preferred. Since such catalysts enhance urea hydrolysis, greater hydrolysis levels can be achieved with equivalent hydrolysis conditions by the use of the catalysts. The catalyst metal is mixed into the urea solution prior to hydrolysis. For instance between about five and about 15, preferably about 10 parts per million (ppm) of catalyst (as metal) is mixed into a 10% urea solution, whereas about 20 to about 60 ppm, preferably about 50 ppm is mixed into a 25% urea solution.

In order to effectively supply sufficient urea hydrolysate to support the SNCR process and provide ammonia for the SCR process, it is desired that at least about 25% of the urea be hydrolyzed. More preferably, at least about 60% of the urea is hydrolyzed, most preferably at least about 80%.

The level of hydrolysis achieved under any particular set of conditions can easily be determined, for instance, by measuring the "P" and "M" alkalinity of the hydrolyzed solution. For example, a 10% solution of urea has a pH of 7.3 with 0 "P" alkalinity and 0.002% "M" alkalinity as $CaCO_3$. When hydrolyzed, the hydrolysate has a pH of about 9.5, with up to 9% "P" alkalinity and 20.2% "M" alkalinity. By comparing the alkalinity of a hydrolyzed solution with a theoretical maximum, using the fresh urea solution as a reference, the level of hydrolysis can be estimated.

Hydrolysis level can also be determined using conductivity in the same manner as alkalinity can be used.

The conductivity of a 10% urea solution is about 1.2 milli-mhos, whereas a 10% urea solution which has been hydrolyzed has a conductivity of about 120 milli-mhos.

The above-described treatment agents can be introduced according to processes which maximize the nitrogen oxides reductions achieved while controlling or minimizing the production of other pollutants. Such processes are described in, for instance, U.S. Pat. No. 4,777,024 to Epperly, Peter-Hoblyn, Shulof, Jr. and Sullivan, U.S. Pat. No. 5,057,293 to Epperly, Peter-Hoblyn, Shulof, Jr., Sullivan, Sprague, and O'Leary; U.S. Pat. No. 4,780,289 to Epperly, Sullivan, Sprague, and O'Leary, the disclosures of each of which are incorporated herein by reference.

When the treatment agent comprises urea or another nitrogenous treatment agent, without a non-nitrogenous hydrocarbon component, it is preferably introduced at an effluent temperature of about 1500° F. to about 2100° F., more preferably about 1700° F. to about 2100° F. In fact, depending on parameters such as concentration and droplet size, effective nitrogen oxides reductions can be achieved using urea or a urea hydrolysate at temperatures above 2100° F. When the treatment agent also comprises one of the enhancers discussed above, it can be introduced at an effluent temperature of about 1200° F. to about 1750° F., more preferably about 1350° F. to about 1750° F. or higher.

These effluent temperatures at the point of introduction can be varied depending on the amount of ammonia desired in the effluent to facilitate the catalytic reduction of nitrogen oxides, particular components of the treatment agent, and other effluent conditions, such as the effluent oxygen level. In fact, the use of an enhancer will generally reduce the level of ammonia in the effluent. If the enhancer reduces the ammonia level to below that desired for the catalyzed $NO_x$ reduction reaction, the enhancer can be introduced at a lower level, or not at all, so that sufficient ammonia is present.

The treatment agent is introduced into the effluent at a molar ratio of the nitrogen in the treatment agent to the baseline nitrogen oxides level in the effluent of about 1:10 to about 10:1. More preferably, the molar ratio of treatment agent nitrogen to baseline $NO_x$ level is about 1:5 to about 5:1 (in the situation where enhancers are introduced without a nitrogenous component, they are introduced at a weight ratio of about 1:10 to about 10:1, preferably about 1:5 to about 5:1). By "baseline nitrogen oxides level" is meant the level (measured or calculated) of nitrogen oxides in the effluent prior to introduction of the treatment agent. The baseline $NO_x$ level is also used in calculating the percentage of nitrogen oxides reduced by measuring the level of nitrogen oxides in the effluent after treatment, dividing that number by the baseline nitrogen oxides level, subtracting from unity and multiplying by 100 to give the $NO_x$ reduction expressed as percentage of baseline.

The treatment agent is preferably supplied to the effluent as a solution, most preferably an aqueous solution, and its concentration in the solution will be at least effective to reduce the level of $NO_x$ in the effluent. The solution can be varied from saturated to very dilute. At higher effluent temperatures, the concentration of urea will be more dilute, say less than about 20% at about 2000° F., and from about 0.5% to about 10% at these or higher temperatures. On the other hand, concentrations of from about 20% to about 40% are more typical for temperatures below about 2000° F.

Advantageously, the size of the droplets of solution will be within the range of from about 10 to about 10,000, and preferably greater than about 50 microns. The droplet size is important to enable uniform mixing of the treatment agent with the effluent and penetration of the treatment agent sufficiently along the internal boiler path that it can achieve its intended function. The size of the droplets will preferably be increased with increasing temperature. At temperatures below about 2000° F., droplet sizes of less than about 150 microns are quite effective, while at higher temperatures the droplets should be larger, and preferably larger than about 500 microns.

In order to effectively reduce the effluent level of nitrogen oxides catalytically, the effluent should contain ammonia in the molar ratio of ammonia to $NO_x$ of about 1:10 to about 5:1, more preferably about 1:5 to about 3:1. In this way, sufficient ammonia is present in the effluent to react with the remaining effluent $NO_x$ in the reaction catalyzed by the catalyst, such that both ammonia and nitrogen oxides are decomposed and rendered safe for discharge into the atmosphere.

The presence of sufficient ammonia can, at least partially, be ensured by varying the effluent temperature at which the treatment agent is introduced (by, for instance, adjusting the location at which the introduction occurs), specific composition and introduction ratio of the treatment agent. These parameters should be adjusted to provide the desired molar ratio of ammonia to nitrogen oxides in the effluent. This can be accomplished using the process and techniques described in U.S. Pat. No. 4,780,289, U.S. Pat. No. 4,830,839, and/or U.S. Pat. No. 5,017,347, which utilize the nitrogen oxides reduction versus effluent temperature curve of a treatment regimen and its curve plateau to control the presence of secondary pollutants such as ammonia while reducing $NO_x$.

By "nitrogen oxides reduction versus effluent temperature curve" is meant a plot of the data points generated when a treatment regimen is effected by introducing a treatment agent into an effluent over a range of effluent temperatures and the nitrogen oxides reduction at each introduction temperature is measured (and usually expressed in terms of percent baseline). "Curve plateau" refers to that region of a nitrogen oxides reduction versus effluent temperature curve where the $NO_x$ reduction is substantially maximized over a range of temperatures and preferably encompasses at least two data points (of course a skilled artisan will recognize that a curve plateau will not necessarily be flat due to "data scatter" and other practical data generation effects). By "treatment regimen" is meant to the introduction (such as by injection) of a treatment agent into an effluent and the conditions under which the treatment agent is introduced, such as treatment agent components (by which is meant the ingredients or chemical formulation of the treatment agent), treatment agent dilution (by which is meant the concentration of treatment agent components when the treatment agent used comprises a solution), relative presence of treatment agent components (by which is meant the relative weight ratio or fractions of the components which form the chemical formulation which makes up the treatment agent), etc.

The introduction temperature of a treatment agent, especially a nitrogenous treatment agent, has predictable effects on both nitrogen oxides reductions achieved and on the amount of ammonia remaining in the effluent after introduction of the treatment agent. With knowledge of this information, the nature (i.e., composition) and introduction of the treatment agent can be carefully coordinated to produce the desired amount of ammonia in the effluent even where the choice of introduction temperatures cannot be altered (in many boilers, retrofitting or providing access for different injection levels is not always possible or economically feasible). Typically, this involves introducing a treatment agent such that it is acting on the "left" side of the plateau of its nitrogen oxides reduction versus effluent temperature curve at the effluent temperature at the point of introduction, in order to generate ammonia for the catalytic aspect of the process.

The introduction rate or other equivalent parameters such as the normalized stoichiometric ratio can also be adjusted to provide ammonia (by normalized stoichiometric ratio is meant the ratio of the concentration of theoretically available reducing-radicals such as $NH_2$ or NCO radicals to the concentration of nitrogen oxides in the effluent; alternatively, the molar ratio of the treatment agent to the $NO_x$ concentration can be used in place of NSR when the chemistry of reduction is not well defined; the term NSR as used herein will also be understood to encompass molar ratio when appropriate).

These methods all cause operation to occur at a different location on the curve and can be achieved in one of two ways. First, the position on the curve at which the treatment regimen being used is being effected can be translated by effecting the treatment regimen at a higher effluent temperature. It will readily be observed that effecting the treatment regimen at a higher effluent temperature will translate the position of operation on the curve further to the right, whereby effecting it at a lower temperature will translate operation to the left.

Effecting the treatment regimen at a different effluent temperature can be accomplished by performing the treatment agent introduction at a location where the effluent temperature is different from the original introduction location. However, this method for effecting the treatment regimen at a different effluent temperature can oftimes be impractical because access to the boiler interior is often limited to specific points, due to water tubing, etc. Introduction at a location where the effluent temperature is at a desired level, therefore, is often not possible.

Altering the operating load of the boiler (i.e., fuel supply rate) will also cause a change in effluent temperature and can, theoretically at least, be used to alter effluent temperature at the treatment agent introduction location by changing operating load. In practice, though, altering the boiler operating load is not preferred because the effluent condition is altered in more ways than the temperature parameter. Nitrogen oxides level, as well as other parameters such as ammonia level and carbon monoxide level, are altered along with effluent temperature. Furthermore, the boiler operating load is usually maintained at a certain level to produce a specific, required output and is not available as a factor which can be altered in this manner.

A second method for operating at a different location on the curve is to vary one or more of the parameters of the treatment regimen being effected. For instance, the varied parameter can be the components of the treatment agent, the dilution of the treatment agent when in solution with a concomitant variation in treatment agent introduction rate to maintain the NSR of the treatment regimen, the relative presence of treatment agent components, or combinations of any of the above. By varying treatment regimen parameters, the original nitrogen oxides reduction versus effluent temperature curve is replaced by the nitrogen oxides reduction versus effluent temperature curve for the varied treatment regimen. Selection of the parameter(s) to be varied and in what way they are varied can replace the original curve with a curve which is "shifted" to the right or the left, thereby leading to operation on the shifted curve at a different position.

For example, if the treatment regimen being effected comprises a treatment agent which is an aqueous solution of 10% urea and 15% furfural, and the effluent temperature at the treatment location is 1755° F., thereby operating toward the right side of the treatment regimen nitrogen oxides reduction versus effluent temperature curve plateau, then varying the treatment regimen by varying the treatment agent components by eliminating the furfural replaces the original curve with a curve at which introduction at that effluent temperature operates further towards the left side of the curve plateau. Likewise, if the treatment regimen being effected comprises a treatment agent which is an aqueous solution of 10% urea and 15% furfural, and the effluent temperature at the point of introduction is 1665° F., thereby operating near the midpoint of the treatment regimen nitrogen oxides reduction versus effluent temperature curve plateau, then varying the treatment regimen to vary the treatment agent to replace the 15% furfural with 15% ethylene glycol replaces the original curve with a curve at which introduction at that effluent temperature operates further towards the right side of the curve plateau.

Of course, the two methods for operating at different points on the curve plateau disclosed according to the present invention are not mutually exclusive, but can in fact be combined. In other words, the effluent temperature can be varied along with one or more treatment regimen parameters.

Unfortunately, tailoring the non-catalytic aspect of the process such that ammonia remains present in the effluent may result in carbon monoxide also being present in the effluent. Although carbon monoxide can be minimized by the processes described above, the presence of carbon monoxide parallels the presence of ammonia, especially when the treatment agent comprises an oxygenate enhancer previously mentioned. That is, when ammonia is present in the effluent as the result of the introduction of a treatment agent for $NO_x$ reduction, carbon monoxide may also be present; therefore, tailoring the process of this invention such that ammonia remains in the effluent in certain amounts, may lead to the presence of carbon monoxide. As will be discussed in more detail below, the catalytic portion of this process can be tailored to also decompose carbon monoxide, which is likewise considered to be an undesirable pollutant.

However, the presence of carbon monoxide in the effluent can, in certain circumstances, function as an "internal enhancer" and thereby eliminate the need for the enhancers discussed above. Under certain combustion conditions and in certain boilers, as will be understood by the skilled artisan, carbon monoxide is formed independent of any nitrogen oxides-reducing processes effected. Although undesirable in most cases, it has been found that the presence of carbon monoxide at the point of chemical injection can be advantageous since the need for an enhancer is avoided, with concomitant economic benefits.

Since the SNCR portion of the process of this invention may not generate sufficient ammonia for the SCR portion, it may be necessary to provide a source of ammonia to make up the difference. This may be accomplished through the introduction of ammonia itself or ammonium water. More advantageously, a compound or compounds which generate ammonia in the effluent is introduced. These include urea, one or more of the hydrolysis products of urea, or the above-described urea hydrolysate. Most preferred are urea or the urea hydrolysate.

Generally, the urea or urea hydrolysate (preferably in solution, especially aqueous solution) is introduced into the effluent at an effluent temperature wherein the urea or the hydrolysate readily converts to ammonia in order to facilitate the catalytic reduction of nitrogen oxides. The effluent temperature at the point of introduction should also be chosen so as to avoid the utilization of the urea or urea hydrolysate, or the ammonia generated therefrom, to reduce $NO_x$ via an SNCR pathway. Although some utilization in this manner is not disadvantageous, there is the possibility of some by-product formation (such as carbon monoxide and nitrous oxide) which could become undesirable emissions themselves.

Accordingly, introduction of the urea hydrolysate should be at an effluent temperature below about 1500° F., preferably below about 1350° F. More preferably, the effluent temperature is between about 230° F. and about 1200° F. When there is a substantial amount of urea present (i.e., when urea itself is being introduced or when there is less than about 80% hydrolysis), the effluent temperature should be at least about 350° F. Most preferably, the effluent temperature at the point of introduction of the urea hydrolysate should be between about 550° F. and about 950° F.

The hydrolysate may be at ambient temperature prior to introduction or, alternatively, it may be at or above its boiling point. In this way, the hydrolysate can flash off immediately upon introduction into the effluent, which might provide advantages in minimizing air requirements for atomization, etc.

Advantageously, the urea or urea hydrolysate is introduced into the effluent in an amount sufficient to provide a molar ratio of the total effluent ammonia to the baseline nitrogen oxides level of about 1:10 to about 5:1. More preferably, treatment solution is introduced into the effluent to provide a molar ratio of ammonia to baseline nitrogen oxides of about 1:5 to about 3:1, most preferably about 1:2 to about 1:1.

After introduction of the treatment agent, and ammonia or ammonia generating compound or compounds, the treated effluent is passed over a catalyst. The catalyst used is one known to the skilled artisan, for instance vanadium oxide, tungsten oxide, titanium oxide, iron oxide, copper oxide, manganese oxide, chromium oxide, noble metals such as platinum group metals like platinum, palladium, rhodium and iridium, or mixtures of these, on a support such as a ceramic or a zeolite.

By passing the effluent, typically at a temperature of about 350° F. to about 1000° F., over the catalyst in the presence of ammonia, nitrogen oxides are further reduced in the effluent. By having tailored the non-catalytic portion of the process to provide ammonia for the catalytic step, the need for injection of ammonia for the catalyst reaction is reduced or, under optimum conditions, eliminated, thusly reducing or eliminating the need for transportation, storage, and handling of ammonia or ammonium water.

When carbon monoxide is also present in the effluent, it can be decomposed by the use of a carbon monoxide catalyst as part of the catalyst bed. Such a catalyst is known in the art and can comprise oxides of metals such as cobalt, molybdenum, chromium, manganese, copper, silver, iron, nickel and vanadium; noble metals such as platinum group metals, like platinum, palladium, rhodium and iridium; or mixtures of these, on a support such as the oxides of aluminum or silicon, a ceramic or a zeolite. Such a CO catalyst can be utilized as an individual unit either upstream or downstream from the $NO_x$-reducing catalyst installation, or in alternating beds with the $NO_x$-reducing catalyst installation. In fact, the carbon monoxide catalyst can also be combined with the $NO_x$ catalyst into a single unit.

The particular components chosen depend on the temperature at which the CO catalyst is expected to operate. For instance, a particular metal oxide or combination of metal oxides which is effective at ammonia-facilitated $NO_x$ reduction at 350° F. to 1000° F., may also be effective at CO reduction at lower temperatures. Likewise, a particular metal oxide or combination of metal oxides which is effective at CO reduction at 350° F. to 1000° F. will not be effective for $NO_x$ reduction at those temperatures. The catalyst chosen for carbon monoxide reduction will depend on whether it is desired that the CO catalyst be interspersed or combined with the $NO_x$-reducing catalyst, in which case it is likely the CO catalyst components will be ineffective at $NO_x$ reduction, or up-or downstream from the $NO_x$-reducing catalyst, in which case it is possible the catalyst components will be similar to those of the $NO_x$-reducing catalyst.

The use of the process of this invention to achieve target levels of nitrogen oxides reductions creates a lessened need for catalyst as compared to an SCR process when used alone. For example, if a 90% reduction in $NO_x$ is desired, the initial portion of the process can reduce about 50% to 60% of the nitrogen oxides, which thereby lessens the burden on the catalytic portion from 90% to less than about 80%. This 10% change represents an increase in the space velocity (the ratio of effluent flow to catalyst volume) by a factor of up to 2, or, in other words, leads to a 50% reduction in catalyst volume needed for a given effluent flow. Such a reduction substantially increases the practicality and economy of the process since the catalyst is by far the most expensive aspect of the process.

Moreover, the use of less catalyst reduces the amount of spent catalyst which must be disposed of. As is well known in the art, the disposal of spent catalyst is difficult due to the environmental concerns engendered thereby. Since typical SCR catalysts are oxides of heavy metals, disposal is costly and tightly regulated. By the reduction of catalyst volume by 50% or greater, these concerns are significantly reduced.

The process of the present invention can lead to substantially improved efficiency and economy of $NO_x$ reduction, especially where significant reductions are desired. For instance, if the boiler in question is a coal fired boiler of the type used by various industries and electric utilities to generate power, steam and process heat, exemplary units of which are based on pulverized coal, stoker-fired and circulating fluidized bed designs among others, the effluent from the unit could theoretically contain a level of nitrogen oxides amounting to 0.9 pounds of nitrogen oxides per million British Thermal Units (MMBTU) heat input or even higher. Based on various local regulations, or for other reasons, it may be necessary to reduce the amount of $NO_x$ by 90%, to 0.09 pounds $NO_x$/MMBTU. If this were to be accomplished using SCR technology alone, for instance a catalyst consisting of vanadium oxide, iron oxide, copper oxide, manganese oxide, chromium oxide, noble metals such as platinum group metals like platinum, palladium, rhodium and iridium, on a support such as zeolites, ceramic or alumina or other commercial, developmental and theoretical materials on which it can be shown that nitrogen oxides is reduced, it can be calculated using cost figures as of the filing date of this application that the required nitrogen oxides reduction would cost a total of about $39,700,000 per year for a 500 megawatt (MW) coal fired unit, which calculates as about $2,300 per ton of nitrogen oxides removed.

Using the process of the present invention, though, can substantially reduce this cost. For instance, the level of nitrogen oxides can be reduced by about 50% to 0.45 pounds per MMBTU by introduction of a first, SNCR, treatment agent and a catalyst can then be used to reduce this level by about 80% to the desired level of 0.09 pounds/MMBTU. On a 500 MW coal fired system, it can be shown that the inventive process results in the need for about 50% of the catalyst needed if SCR alone were used and in annual costs of about $23,300,000, or almost one half the cost when SCR is used alone. The nitrogen oxides reduction cost drops to about $1,355 per ton of $NO_x$ removed, a savings of about 40%. The calculations behind these savings are based upon Example I and are illustrated in Table 1.

TABLE 1

| EXAMPLE | UTILITY BOILER | |
|---|---|---|
| Fuel | Coal | |
| Rating | 500 MW | |
| Baseline $NO_x$ | 0.9 lb/MMBTU | |
| Desired $NO_x$ | 0.09 lb/MMBTU | |
| PROCESS | SCR Alone | Inventive Process |
| Investment, $MM | 69.0 | 44.0 |
| Annualized Investment, $MM/Year | 12.1 | 7.7 |
| Operating Costs, $MM/year | | |
| Chemical | 1.0 | 2.2 |
| Material, Utilities, Labor & Overhead | 26.6* | 13.4* |
| Total Annual Cost, $MM/Year | 39.7 | 23.3 |
| $/Ton of $NO_x$ Removed | 2310 | 1355 |

*Includes catalyst replacement.

As another example, it can be seen in a natural gas fired boiler widely used by industries and utilities to produce power, steam or process heat, cost savings can accrue using the process of the present invention versus SCR alone. In one case where initial nitrogen oxide effluent levels of 0.14 pounds/MMBTU need to be reduced by 80% to 0.028 pounds/MMBTU, SCR systems (based on conventional, non-conventional or developmental catalysts, e.g., of the types noted above) result in application costs for a 100 MMBTU/hour boiler which could total $180,000 annually or $3,660 per ton of $NO_x$ removed. Instead, by utilizing the process of the present invention, 50% reduction of nitrogen oxides (from 0.14 to 0.07 pounds/MMBTU) by introduction of a nitrogenous treatment agent is achieved with 60% reduction from that level to 0.028 pounds/MMBTU using the catalyst. It can be shown that a catalyst volume of 60% is all that is required and that total costs may be about $120,000 per year or about $2,460 per ton of $NO_x$ removed, a cost savings of about 33% (see Example II and Table 2).

TABLE 2

| EXAMPLE | UTILITY BOILER | |
|---|---|---|
| Fuel | Natural Gas | |
| Rating | 100 MMBTU/Hour | |
| Baseline $NO_x$ | 0.14 lb/MMBTU | |
| Desired $NO_x$ | 0.028 lb/MMBTU | |
| PROCESS | SCR Alone | Inventive Process |
| Investment, $M | 623.0 | 281.0 |
| Annualized Investment, $M/Year | 109.0 | 49.0 |
| Operating Costs, $M/year | | |
| Chemical | 7.0 | 15.0 |
| Material, Utilities, Labor & Overhead | 64.0* | 56.0* |
| Total Annual Cost, $M/Year | 180.0 | 120.0 |
| $/Ton of $NO_x$ Removed | 3660 | 2460 |

*Includes catalyst replacement.

These increases in economy and efficiency can also be shown when the process of this invention is used in place of SCR for other boilers, process heaters, turbines and other combustion units fired with oil, other hydrocarbons, other fossil fuels, waste gases, liquids and solids, such as municipal solid waste, wood waste, petroleum, coke, etc. In all cases, since some of the cost burden of SCR is replaced by lower cost non-catalytic processes and since the non-catalytic system can be tailored to optimize the overall urea/ammonia/$NO_x$ ratios to maximize cost effectiveness, then the system provides a unique solution to a variety of nitrogen oxides reduction problems.

By the use of this system, ammonia which is needed for efficient operation of the catalyst system is at least partially provided by the non-catalytic process which performs the dual function of achieving substantial $NO_x$ reductions and providing ammonia for the catalyst. Moreover, the inventive process provides a means for decomposing carbon monoxide which will also be formed under certain conditions during the generation of ammonia in the non-catalytic process. In this way, neither carbon monoxide nor ammonia is released to the atmosphere to a substantial extent, yet ammonia is available for the catalytic process.

BEST MODE FOR CARRYING OUT THE INVENTION

The following examples further illustrate and explain the invention by describing the design of an operation of an installation using the inventive process, as compared to SCR alone.

DESIGN EXAMPLE I

The boiler used is a 500 megawatt (MW) coal-fired boiler utilizing bituminous coal (26 MMBTU/Ton) which is fired at a rate of 5300 MMBTU/Hour. It is found that the baseline level of nitrogen oxides in the effluent is 4770 lbs/hour, or 0.9 lb/MMBTU, and it is desired that this level be reduced by 90% to 477 lb/hour, or 0.09 lb/MMBTU.

a.) When using SCR alone, the effluent is passed over a catalyst comprising vanadium oxide on a ceramic honeycomb support. The catalyst is placed in a location where the effluent is at a temperature of about 800° F. and ammonia is injected at a rate of 1940 lbs/hour. The ammonia slip resulting is 50 parts per million (ppm) and the Space Velocity necessary for achieving reduction of $NO_x$ by 90% (or 0.81 lb/MMBTU) is found to be 6000 hour$^{-1}$.

b.) When using the inventive process, a 10% aqueous solution of urea is first injected into the effluent at a rate of 7738 lbs of urea/hour at a location where the effluent temperature is about 1700° F. to reduce the $NO_x$ by 62%, or 0.56 lb/MMBTU and to generate ammonia at the rate of 526 lbs/hour or 0.099 lbs/MMBTU. The effluent is then passed over the catalyst as described above, except that ammonia is not injected. The ammonia slip resulting is 5 ppm and the Space Velocity necessary for achieving reduction of $NO_x$ by a further 74% (or 0.25 lb/MMBTU) from 0.34 lb/MMBTU to 0.09 lb/MMBTU is 11,000 hour$^{-1}$.

DESIGN EXAMPLE II

The boiler used is a 100 MMBTU/hour natural gas-fired boiler utilizing natural gas (1,000 BTU/Standard Cubic Feet, SCF) which is fired at a rate of 100,000 SCF/hour. It is found that the baseline level of nitrogen oxides in the effluent is 14 lbs/hour, or 0.14 lb/MMBTU, and it is desired that this level be reduced by 80% to 2.8 lb/hour, or 0.028 lb/MMBTU.

a.) When using SCR alone, the effluent is passed over a catalyst comprising vanadium oxide on a ceramic honeycomb support. The catalyst is placed in a location where the effluent is at a temperature of about 800° F. and ammonia is injected at a rate of 4.4 lbs/hour. The ammonia slip resulting is 5 ppm and the Space Velocity necessary for achieving reduction of $NO_x$ by 80% (or 0.112 lb/MMBTU is found to be 8500 hour$^{-1}$.

b.) When using the inventive process, a 10% aqueous solution of urea is first injected into the effluent at a rate of 19.72 lbs of urea/hour at a location where the effluent temperature is about 1700° F. to reduce the $NO_x$ by 54%, or 0.076 lb/MMBTU and to generate ammonia at the rate of 1.3 lbs/hour or 0.013 lbs/MMBTU. The effluent is then passed over the catalyst as described above, except that ammonia is not injected. The ammonia slip resulting is less than 2 ppm and the Space Velocity necessary for achieving reduction of $NO_x$ by a further 57% (or 0.036 lb/MMBTU) from 0.064 lb/MMBTU to 0.028 lb/MMBTU is 18,000 hour$^{-1}$.

The above description is for the purpose of teaching the person of ordinary skill in the art how to practice the present invention, and it is not intended to detail all of those obvious modifications and variations of it which will become apparent to the skilled worker upon reading the description. It is intended, however that all such obvious modifications and variations be included within the scope of the present invention which is defined by the following claims.

We claim:

1. A process for the reduction of nitrogen oxides in the effluent from the combustion of a carbonaceous fuel, the process comprising:
   a) introducing a nitrogenous treatment agent other than ammonia into the effluent at an effluent temperature of about 1500° F. to about 2100° F. to create a treated effluent having reduced nitrogen oxides concentration, wherein the conditions under which said nitrogenous treatment is introduced are such that ammonia is present in the treated effluent and further wherein said nitrogenous treatment agent is selected from the group consisting of urea, one or more of the hydrolysis products of urea, a urea hydrolysate, ammonium carbonate, ammonium bicarbonate, ammonium carbamate, ammonium formate, ammonium oxalate, hexamethylenetetramine, and mixtures thereof;
   b) introducing a source of ammonia into the effluent under conditions designed to avoid the non-catalytic reduction of nitrogen oxides such that the ratio of the total ammonia level in the effluent to the effluent nitrogen oxides level is about 1:10 to about 5:1; and
   c) contacting the treated effluent with a catalyst effective for the reduction of nitrogen oxides in the presence of ammonia.

2. The process of claim 1, wherein said nitrogenous treatment agent comprises urea or a urea hydrolysate.

3. The process of claim 2, wherein said nitrogenous treatment agent further comprises an enhancer selected from the group consisting of an oxygenated hydrocarbon, a heterocyclic hydrocarbon having at least one cyclic oxygen, sugar, molasses and mixtures thereof.

4. The process of claim 3, wherein said nitrogenous treatment agent is introduced at an effluent temperature of about 1350° F. to about 1750° F.

5. The process of claim 2, wherein said nitrogenous treatment agent is introduced at a molar ratio of treatment agent nitrogen to effluent baseline nitrogen oxides level of about 1:10 to about 10:1.

6. The process of claim 1, wherein the molar ratio of ammonia in the treated effluent to nitrogen oxides in the treated effluent is about 1:5 to about 3:1.

7. The process of claim 6, wherein said nitrogenous treatment agent is introduced on the left side of the plateau of the nitrogen oxides reduction versus effluent temperature curve of said nitrogenous treatment agent.

8. The process of claim 1, wherein said source of ammonia comprises ammonia, ammonium water, urea, one or more of the hydrolysis products of urea, a urea hydrolysate or mixtures thereof.

9. The process of claim 8, wherein the effluent, when contacted with said catalyst, is at a temperature of about 350° F. to about 1000° F.

10. A process for the reduction of nitrogen oxides in the effluent from the combustion of a carbonaceous fuel to a predetermined level, the process comprising:
   a) selecting a desired maximum level of nitrogen oxides in the effluent;
   b) introducing a nitrogenous treatment agent other than ammonia into the effluent at an effluent temperature of about 1500° F. to about 2100° F. to at least partially reduce the nitrogen oxides level in the effluent to said maximum level, and cause ammonia to be present in the effluent, wherein said nitrogenous treatment agent is selected from the group consisting of urea, one or more of the hydrolysis products of urea, a urea hydrolysate, ammonium carbonate, ammonium bicarbonate, ammonium carbamate, ammonium formate, ammonium oxalate, hexamethylenetetramine, and mixtures thereof;
   c) introducing a source of ammonia into the effluent under conditions designed to avoid the non-catalytic reduction of nitrogen oxides such that the ratio of the total ammonia level in the effluent to the effluent nitrogen oxides level is about 1:10 to about 5:1; and
   d) contacting the ammonia-containing effluent with a catalyst effective for the reduction of nitrogen oxides in the effluent in the presence of ammonia to said maximum level.

11. The process of claim 10, wherein said nitrogenous treatment agent comprises urea or a urea hydrolysate.

12. The process of claim 10, wherein said nitrogenous treatment agent further comprises an enhancer selected from the group consisting of an oxygenated hydrocarbon, a heterocyclic hydrocarbon having at least one cyclic oxygen, sugar, molasses and mixtures thereof.

13. The process of claim 12, wherein said nitrogenous treatment agent is introduced at an effluent temperature of about 1350° F. to about 1750° F.

14. The process of claim 11, wherein said nitrogenous treatment agent is introduced at a molar ratio of treatment agent nitrogen to effluent baseline nitrogen oxides level of about 1:10 to about 10:1.

15. The process of claim 10, wherein said nitrogenous treatment agent is introduced at molar ratio and a temperature wherein the molar ratio of ammonia in the treated effluent to nitrogen oxides in the treated effluent is about 1:10 to about 10:1.

16. The process of claim 10, wherein said source of ammonia comprise..s ammonia, ammonium water, urea, one or more of the hydrolysis products of urea, a urea hydrolysate or mixtures thereof.

* * * * *

UNITED STATES PATENT AND TRADEMARK OFFICE
CERTIFICATE OF CORRECTION

PATENT NO. : 5,286,467
DATED : February 15, 1994
INVENTOR(S) : William H. Sun, et al It is certified that error appears in the above-indentified patent and that said Letters Patent is hereby corrected as shown below:

Column 6, line 25, "500°F. or five minutes" should read --500° F. for five minutes--.

At column 7, line 13, insert --Epperly, O'Leary and Sullivan, and U.S. 5,017,347 to-- immediately after "U.S. Pat. No. 4,780,289 to".

At column 18, line 9, "comprises..s" should read --comprises--.

Signed and Sealed this

Twenty-sixth Day of July, 1994

Attest:

BRUCE LEHMAN

*Attesting Officer*        *Commissioner of Patents and Trademarks*